(12) United States Patent
Keller

(10) Patent No.: US 12,151,921 B2
(45) Date of Patent: Nov. 26, 2024

(54) INDUSTRIAL TRUCK

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 460 days.

(21) Appl. No.: 17/610,447

(22) PCT Filed: Mar. 12, 2020

(86) PCT No.: PCT/EP2020/056650
§ 371 (c)(1),
(2) Date: Nov. 11, 2021

(87) PCT Pub. No.: WO2020/229018
PCT Pub. Date: Nov. 19, 2020

(65) Prior Publication Data
US 2022/0204325 A1 Jun. 30, 2022

(30) Foreign Application Priority Data
May 14, 2019 (DE) ............ 10 2019 112 577.4

(51) Int. Cl.
*B66F 9/07* (2006.01)
*B66F 9/08* (2006.01)
*B66F 9/24* (2006.01)
*B64F 1/32* (2006.01)

(52) U.S. Cl.
CPC ............ *B66F 9/07* (2013.01); *B66F 9/08* (2013.01); *B66F 9/24* (2013.01); *B64F 1/322* (2020.01)

(58) Field of Classification Search
CPC ................................ B66F 9/07; B66F 9/08
See application file for complete search history.

(56) References Cited

U.S. PATENT DOCUMENTS

| 2,998,891 | A | * | 9/1961 | Baur | B66F 9/07545 187/234 |
| 3,031,091 | A | * | 4/1962 | Erickson | B66F 9/07554 414/544 |
| 3,136,433 | A | | 6/1964 | Inghram | |
| 3,225,867 | A | | 12/1965 | Inghram | |

(Continued)

FOREIGN PATENT DOCUMENTS

| DE | 101 33 815 A1 | 2/2003 |
| DE | 20 2004 020 224 U1 | 6/2005 |

(Continued)

*Primary Examiner* — Mark C Hageman
(74) *Attorney, Agent, or Firm* — Norman B. Thot

(57) ABSTRACT

An industrial truck includes a loading platform onto which and from which a load is pushable in a direction, and masts which are arranged opposed to each other. The masts lift, lower, and guide the loading platform, which is arranged between the masts, in a lifting and lowering direction. Each of the masts has guide profiles, each of which has an inner cross-section with a side surface which extends in the lifting and lowering direction and which is perpendicular to the direction. The loading platform has at least one guide element for each of the guide profiles. The at least one guide element slides and/or rolls on the side surface of the respective guide profile.

15 Claims, 18 Drawing Sheets

(56) References Cited

U.S. PATENT DOCUMENTS

| | | | | |
|---|---|---|---|---|
| 3,757,899 A * | 9/1973 | Smith, Jr. | ............... | B66F 9/07 |
| | | | | 414/664 |
| 3,841,503 A * | 10/1974 | Hollenbach | ............ | B66F 9/07 |
| | | | | 414/541 |
| 5,641,041 A * | 6/1997 | Masuda | ................ | B66F 9/07 |
| | | | | 187/347 |
| 8,056,681 B2 * | 11/2011 | Fukuda | ................ | B66F 9/07 |
| | | | | 187/244 |
| 2007/0140817 A1 | 6/2007 | Hansl | | |
| 2009/0162176 A1 * | 6/2009 | Link | ............... | B65G 1/0421 |
| | | | | 414/659 |
| 2017/0121109 A1 * | 5/2017 | Behling | ........... | B66F 9/07513 |
| 2020/0385253 A1 * | 12/2020 | Maurer | ............. | B66F 9/205 |

FOREIGN PATENT DOCUMENTS

| | | | |
|---|---|---|---|
| EP | 3 064 466 A1 | 9/2016 | |
| WO | WO 2005/087648 A1 | 9/2005 | |
| WO | WO 2006/069557 A1 | 7/2006 | |
| WO | WO 2015/074755 A2 | 5/2015 | |

* cited by examiner

INDUSTRIAL TRUCK

CROSS REFERENCE TO PRIOR APPLICATIONS

This application is a U.S. National Phase application under 35 U.S.C. § 371 of International Application No. PCT/EP2020/056650, filed on Mar. 12, 2020 and which claims benefit to German Patent Application No. 10 2019 112 577.4, filed on May 14, 2019. The International Application was published in German on Nov. 19, 2020 as WO 2020/229018 A1 under PCT Article 21(2).

FIELD

The present invention relates to an industrial truck comprising opposing masts for lifting, lowering, and guiding a loading platform which is located between the masts in a lifting and lowering direction.

The present invention in particular relates to an industrial truck which is used to transport air freight shipment pallets or containers.

BACKGROUND

Such an industrial truck has previously been described under the name "Xway Mover 7000" from the company DIMOS Maschinenbau GmbH. In this industrial truck, four masts are provided for lifting, lowering and guiding. In order to absorb forces which act on the masts when the pallets or containers are pushed onto the loading platform, each mast is equipped with an extra profile which is provided for this purpose. In order to lift and lower the loading platform, each of the four masts is equipped with a hydraulic cylinder. The hydraulic cylinders are supplied with hydraulic fluid separately from one another.

The disadvantage of this industrial truck is that it is expensive to manufacture.

SUMMARY

An aspect of the present invention is to provide an industrial truck, in particular for transporting air freight shipment pallets or containers, whose manufacturing complexity is comparatively reduced.

In an embodiment, the present invention provides an industrial truck which includes a loading platform which is configured so that a load is pushable thereon and therefrom in a direction, and masts which are arranged opposed to each other. The masts are configured to lift, to lower, and to guide the loading platform which is arranged between the masts in a lifting and lowering direction. Each of the masts comprises at least two guide profiles, each of which comprise an inner cross-section which comprises a first side surface which extends in the lifting and lowering direction and which is perpendicular to the direction. The loading platform comprises at least one guide element for each of the at least two guide profiles. The at least one guide element is configured to at least one of slide and roll on the first side surface of the respective guide profile.

BRIEF DESCRIPTION OF THE DRAWINGS

The present invention is described in greater detail below on the basis of embodiments and of the drawings in which.

DETAILED DESCRIPTION

Figure 1:
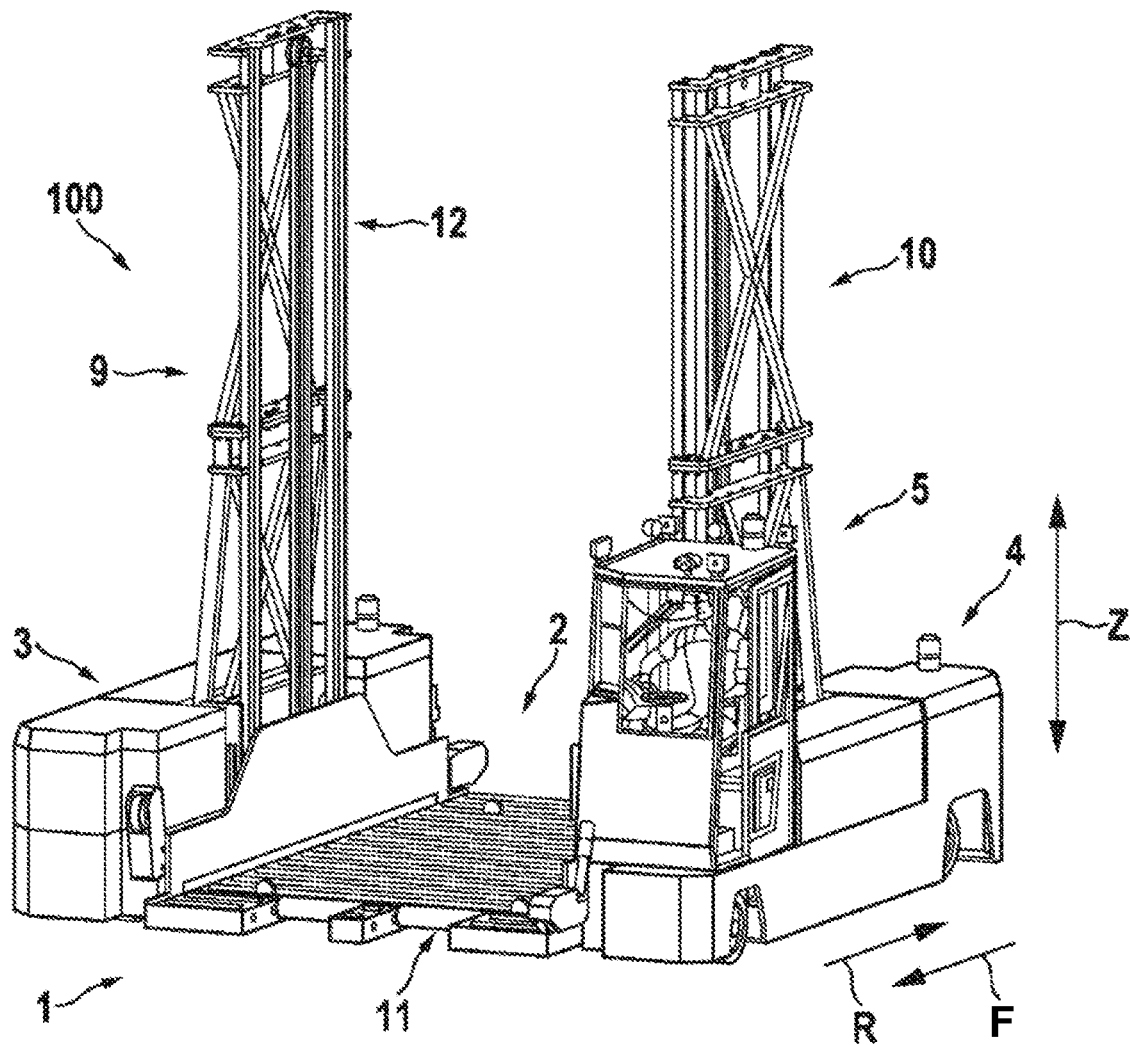
FIG. 1 is a first perspective view of an embodiment of an industrial truck according to the present invention.
Figure 2:
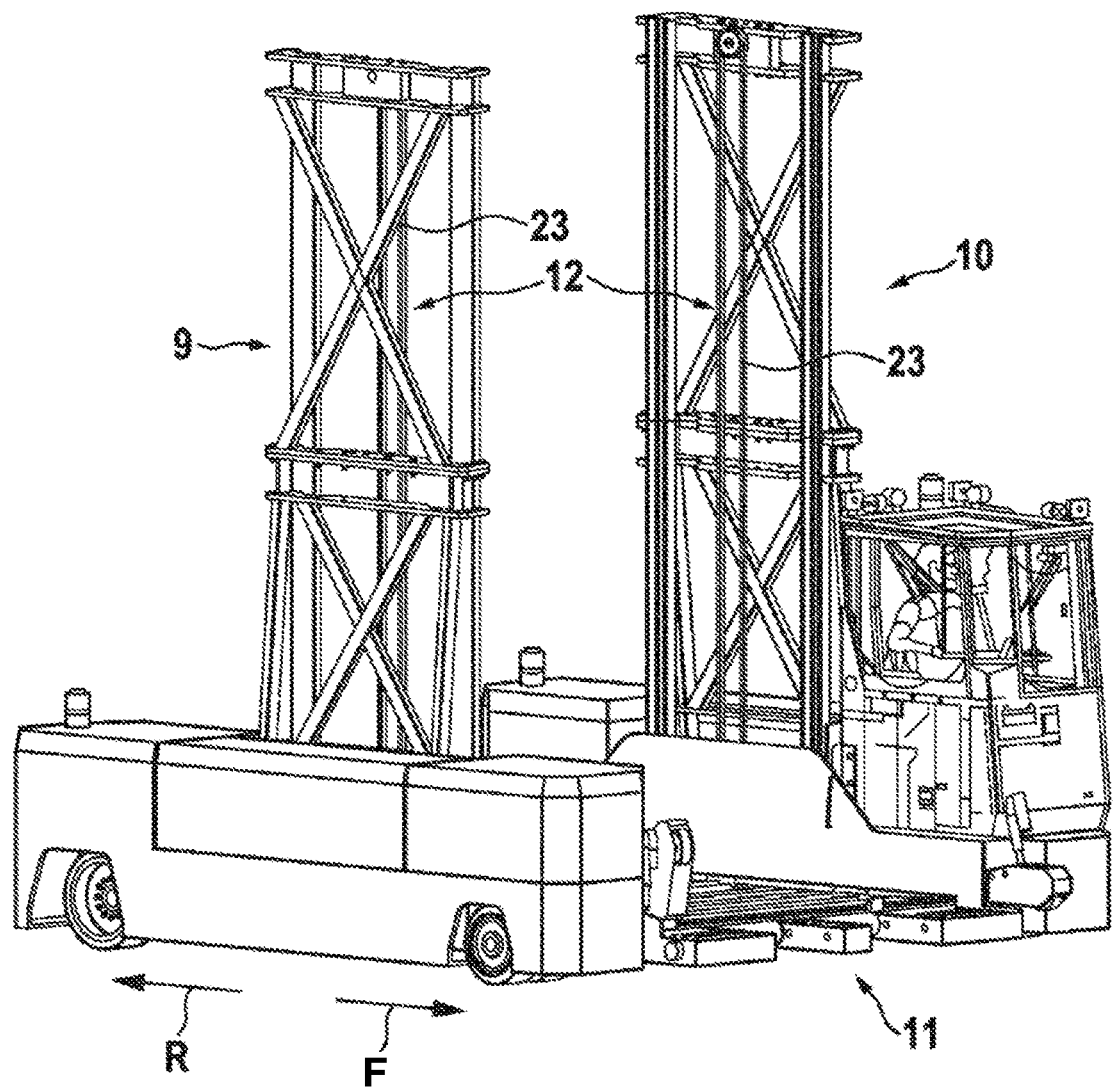
FIG. 2 is a second perspective view of the same embodiment.
Figure 3:
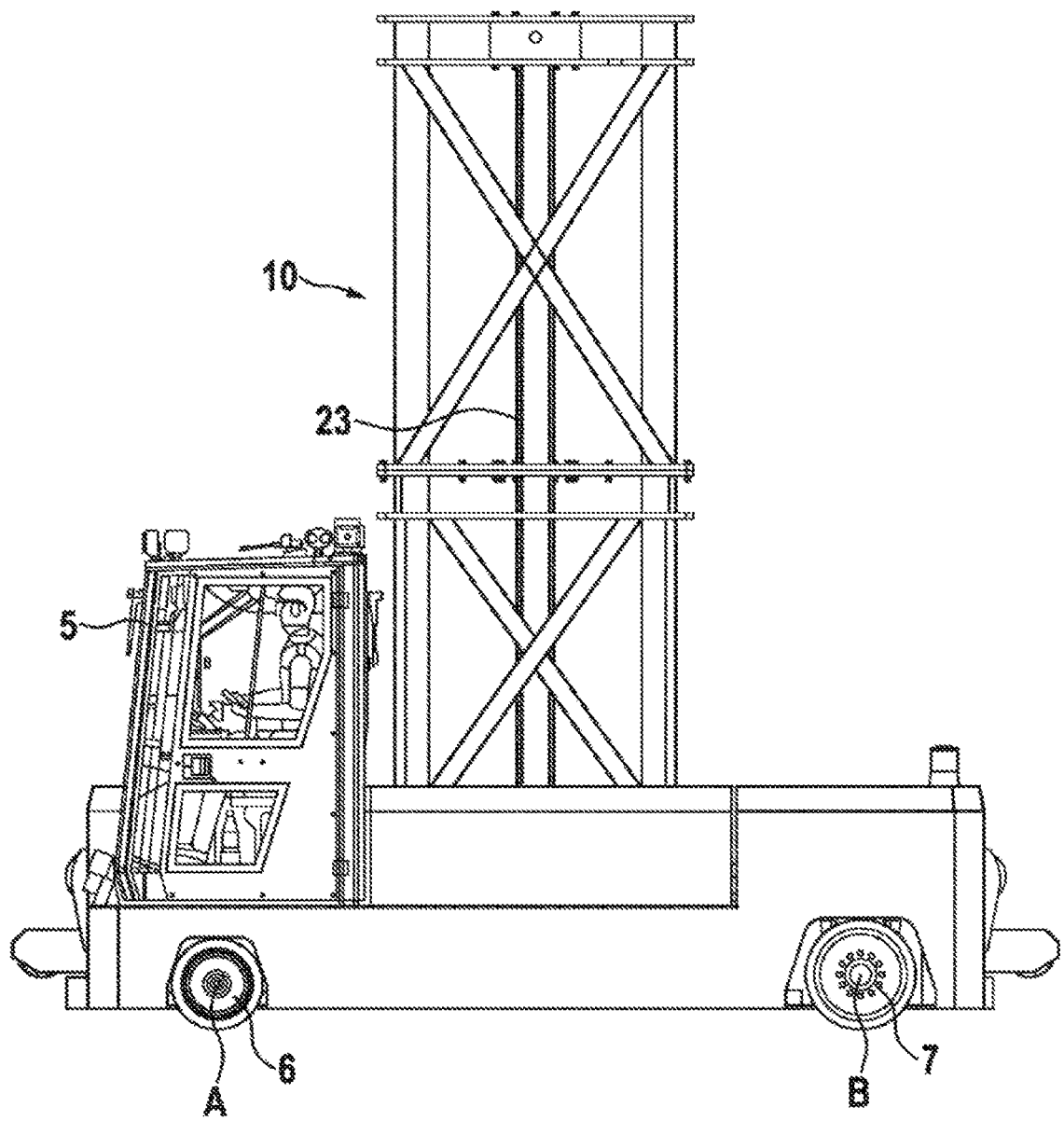
FIG. 3 is a side view of the same embodiment.
Figure 4:
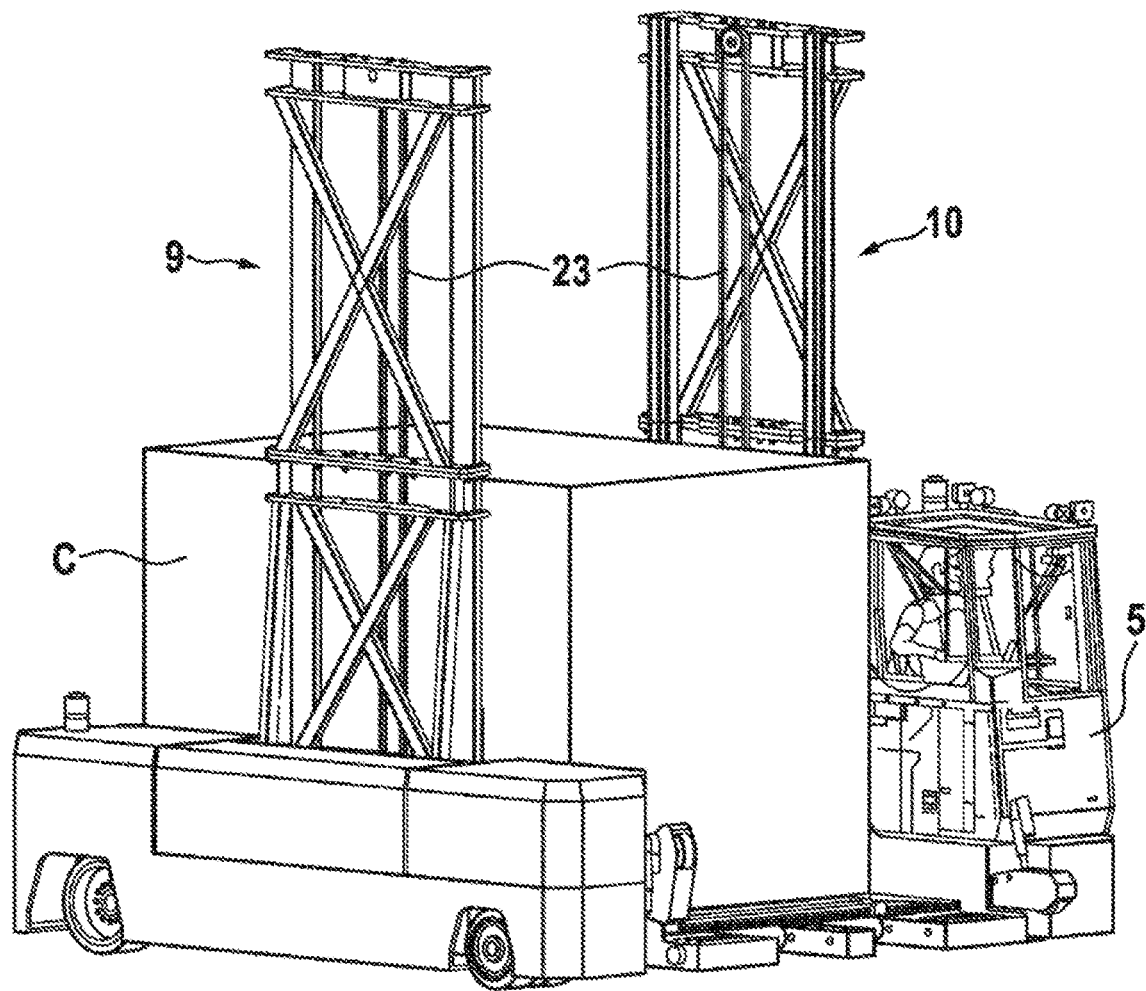
FIG. 4 is a view, corresponding to FIG. 2 of the same embodiment, but loaded with a transport container.

In the industrial truck according to the present invention, each of the masts comprises at least two guide profiles, each guide profile having an inner cross-section having a side surface that extends in the lifting and lowering direction and perpendicular to the direction in which loads, such as air freight shipment pallets or containers, are pushed onto or down from the loading platform. This direction usually corresponds to the forward and reverse direction of travel of the industrial truck. The loading platform comprises at least one guide roller for each guide profile, which guide roller rolls on the side surface of the relevant guide profile. Due to this design of the masts, the force acting on the loading platform when a pallet or a container is pushed onto the platform, which force is directed transversely to the weight force and is therefore also referred to as the "transverse force," is introduced directly into the masts, without the need for a special design of the masts therefor. Since each of the masts comprises at least two guide profiles, the industrial truck according to the present invention is not only suitable for absorbing the transverse force acting on the loading platform when a pallet or container is pushed onto the platform, but also for absorbing an opposing transverse force which occurs when the pallet or container is pulled down or which acts on the loading platform when a pallet or a container is pushed on in the opposite direction, i.e., acts on the loading platform from the rear, for example.

The provision of two guide profiles per mast has the effect that only two masts are required to lift, lower, and guide the loading platform, which further reduces the manufacturing complexity associated with the industrial truck according to the present invention.

A further development of the industrial truck according to the present invention provides that the inner cross-sections of the guide profiles can, for example, be C-shaped, in each case having a base surface and two mutually parallel side surfaces which extend perpendicular from the base surface to an open profile side, the guide profiles being arranged on the relevant mast so that the open profile sides of the guide profiles of different masts face each other. This design of the guide profiles allows commercially available profiles to be used. The mutually facing arrangement of the open profile sides of the guide profiles of different masts also has the effect that the loading platform is guided by the guide profiles not only in the direction described above, but also in a transverse direction perpendicular thereto, i.e., toward one of the masts, in which the guide elements, in particular the guide rollers, slide on the base surfaces of the guide profiles.

In an embodiment of the industrial truck according to the present invention, exactly two masts can, for example, be provided.

Exactly one guide element, in particular exactly one guide roller, can, for example, be provided for each guide profile.

The manufacturing complexity of the industrial truck according to the present invention increases slightly if, for example, a plurality of guide elements, for example, exactly two guide elements, for example, guide rollers, which are spaced apart from each other in the lifting and lowering direction, are provided for each guide profile. The plurality of guide elements, in particular guide rollers, per guide profile, prevents the loading platform from being able to tilt about an axis which extends parallel with the surface thereof and perpendicular to the transverse direction.

In order to be able to raise or lower the loading platform via a motor, each mast can, for example, comprises two pulleys which are spaced apart in the lifting and lowering direction and around which a flexible pulling device revolves, it being possible for at least one of the pulleys to be rotationally driven via a drive device. The flexible pulling device can, for example, be one or more V-belts which extend parallel with each another. The pulleys are in this case designed as single or double belt pulleys. A mast designed in this way is characterized by a lower manufacturing complexity compared to a mast in which a hydraulic cylinder is provided for lifting and lowering the loading platform.

This flexible pulling device can, for example, be arranged so that it comprises two strands which extend in the lifting and lowering direction. The loading platform must then be connected to one of these two strands for the purpose of lifting and lowering, and one of the two pulleys must be driven in the corresponding direction of rotation via the drive device. The loading platform can, for example, be connected to two parallel strands of the flexible pulling device of the two masts since the mechanical loading of the flexible pulling device is then reduced.

The drive device, via which a pulley can be rotationally driven, can, for example, comprise an electric motor. Via a suitable electronic control, the drive device can then be supplied with power in a very precise manner, and a load, for example, the pallet or the container, can thus be lifted or lowered particularly precisely.

In an embodiment of the industrial truck according to the present invention, the industrial truck can, for example, comprise steering motors and travel drives which are also designed to be electrically operated. This further development of the industrial truck according to the present invention is again characterized by a particularly low manufacturing complexity since the industrial truck can be operated using only a single energy source (an electrical power storage device).

The present invention will be explained greater detail below under reference to the accompanying drawings.

The embodiment of an industrial truck according to the present invention (hereinafter "industrial truck 100" for short) shown in the drawings comprises a chassis 1 having a loading region 2 which is delimited by side regions 3, 4. Components (not visible in the drawings) which are required for the operation of the industrial truck 100, for example, energy stores such as fuel tanks and batteries, drive devices for driving and lifting functions, electrical and hydraulic circuits for controlling the driving and lifting performance in an open-loop or closed-loop manner and for steering the industrial truck, etc. are accommodated in the two side regions 3 and 4.

In FIG. 1, the forward and reverse directions F, R are symbolized by the arrows F, R.

A driver's cab 5 is arranged in the front region of the left-hand side region 4, as seen in the forward travel direction F. The driver's cab 5 comprises the actuating device which is required for operating the industrial truck 100, such as buttons, switches, joysticks and a steering wheel.

Figure 5:
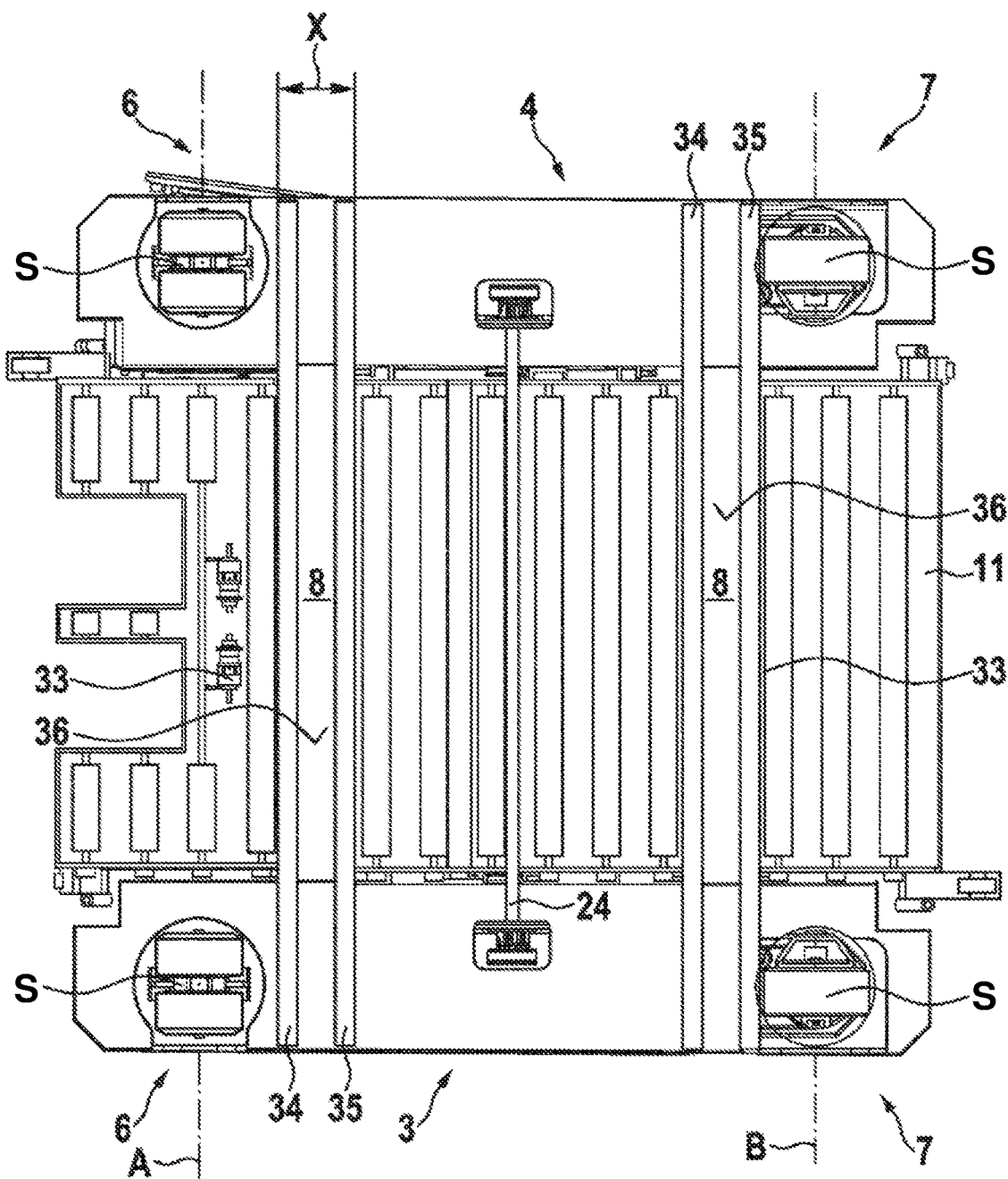
FIG. 5 is a view from below of the same embodiment.
Figure 6:
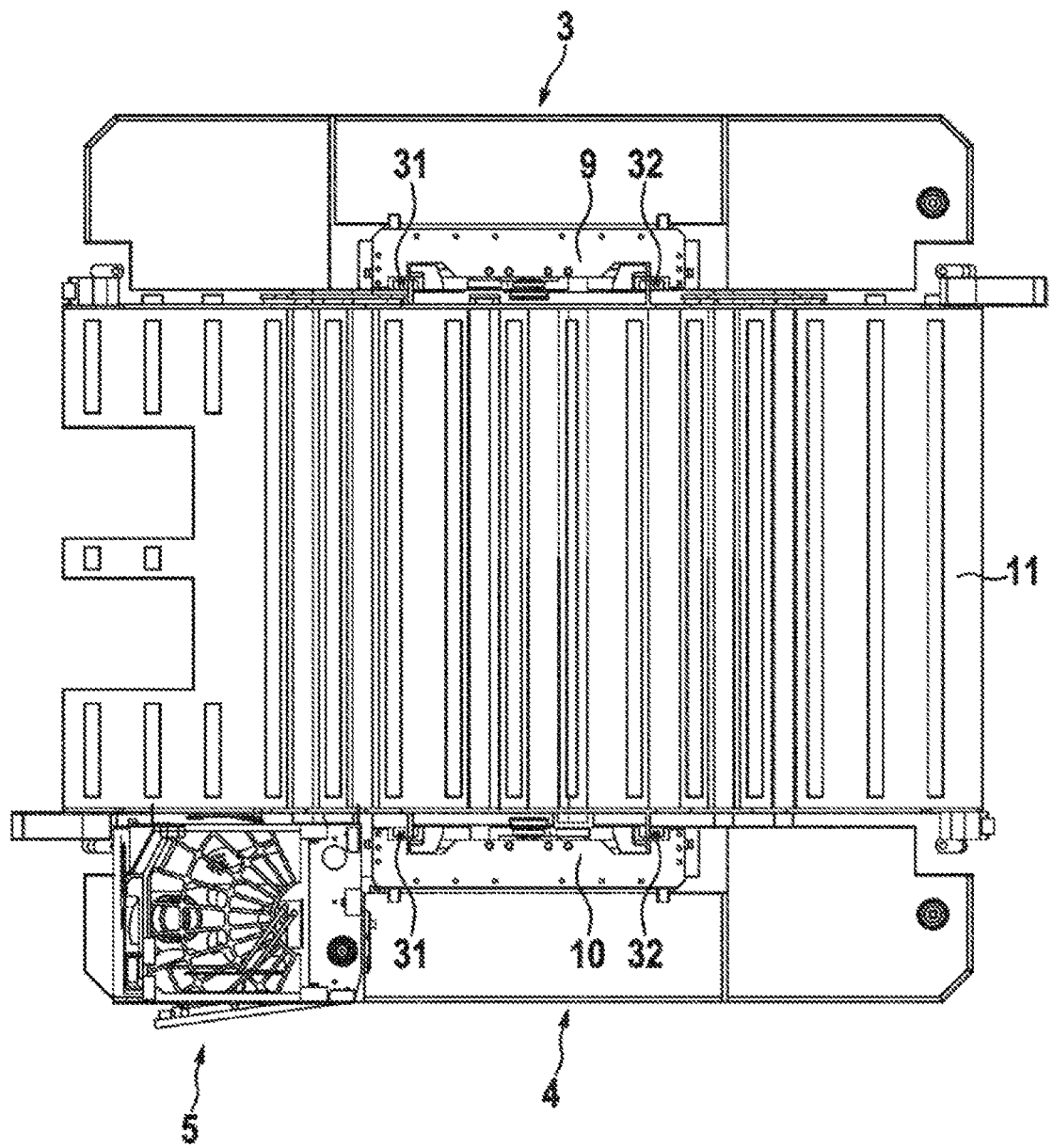
FIG. 6 is a view from above of the same embodiment.

As can in particular be seen in FIG. 5, the industrial truck 100 has four wheels, the front wheels 6 associated with the front axle A being designed as twin wheels, and the rear wheels 7 associated with the rear axle B being designed as single wheels. All of the four wheels are designed to be steerable so that they can be rotated through 360° about their relevant steering axle S. Each of the wheels 6, 7 is connected to its own steering motor (which is not shown in the drawings). All of the steering motors can, for example, be designed as electric motors and be controlled via a steering computer so that the industrial truck 100 can execute travel direction changes in any sequence without stopping. A loading or unloading station can thus be approached directly without complex maneuvering.

At least one of the front wheels 6 and rear wheels 7 is coupled to a travel drive. In order to improve the traction, all of the front wheels 6 and rear wheels 7 can, for example, each be coupled to a travel drive. The travel drive(s), like the steering motors, can comprise electric motors.

As can be seen in FIG. 5, the chassis 1 has two cross-bars/cross members 8 which extend in parallel with each other and which are arranged between the front axle A and the rear axle B. The cross members 8 connect the side regions 3 and 4. The cross members 8 are arranged close to the ground and have a comparatively low overall height Y compared to the transverse extension X so that a low loading and unloading height H can be achieved in the case of the industrial truck 100, as will be explained in more detail below.

Two masts 9, 10 extend upward from the chassis 1. The mutually facing sides of the two masts 9, 10 are arranged to be at least almost flush with mutually facing sides of the side regions 3, 4.

The two masts 9, 10 are used to raise and to lower a loading platform 11 in a lifting and lowering direction Z. The loading platform 11 is used to carry a load, for example, a container C. For this purpose, each mast 9, 10 has a flexible pulling device 12 which revolves around a lower pulley 13 and an upper pulley 14. In the shown embodiment, the flexible pulling device 12 comprises two V-belts which extend parallel with each other. The V-belts are tensioned between the lower and upper pulleys 13, 14, which are designed as double belt pulleys. While the upper pulley 14 is mounted in a bearing block 15 so as to be freely rotatable about an axis 16, the lower pulley 13 is non-rotatably connected to the drive shaft 17 of a drive device 18. The drive device 18 can, for example, also comprise an electric motor.

Figure 12:
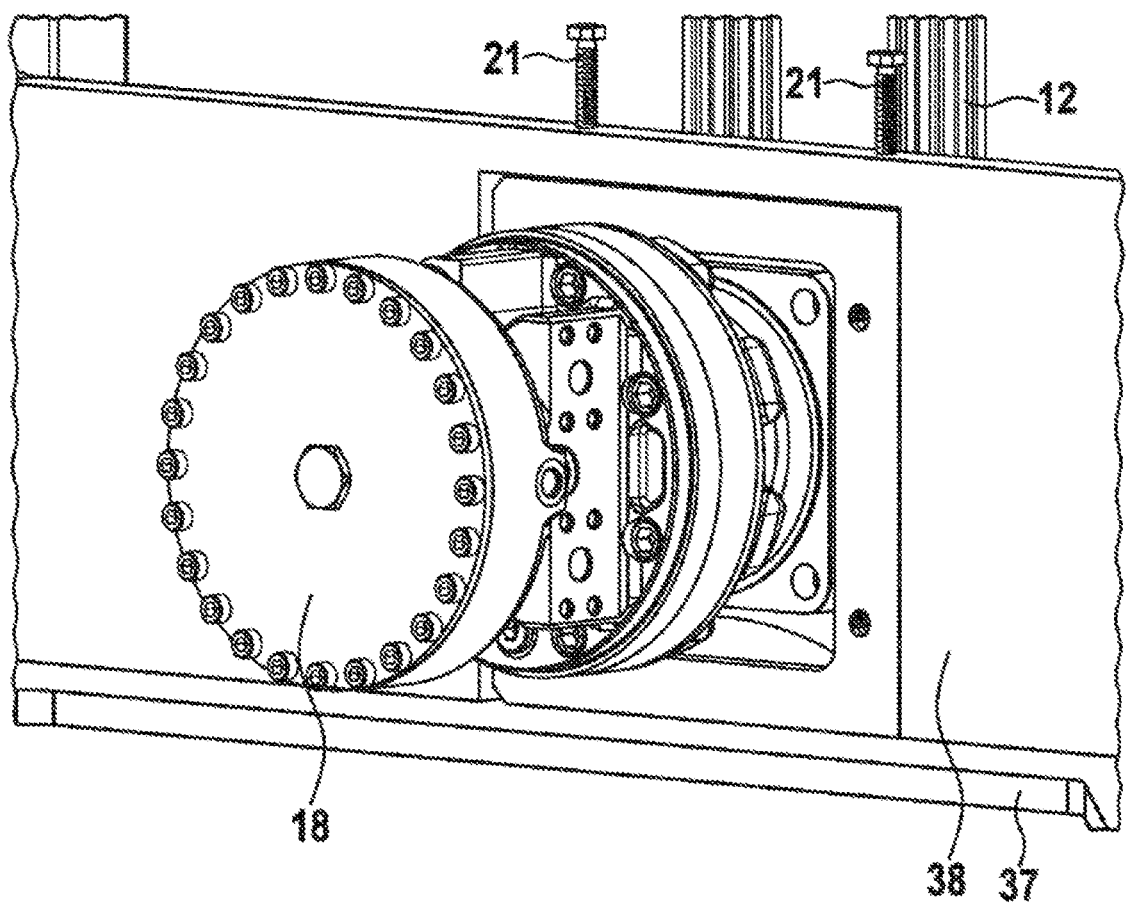
FIG. 12 is a detailed view of a drive device of this mast.
Figure 13:
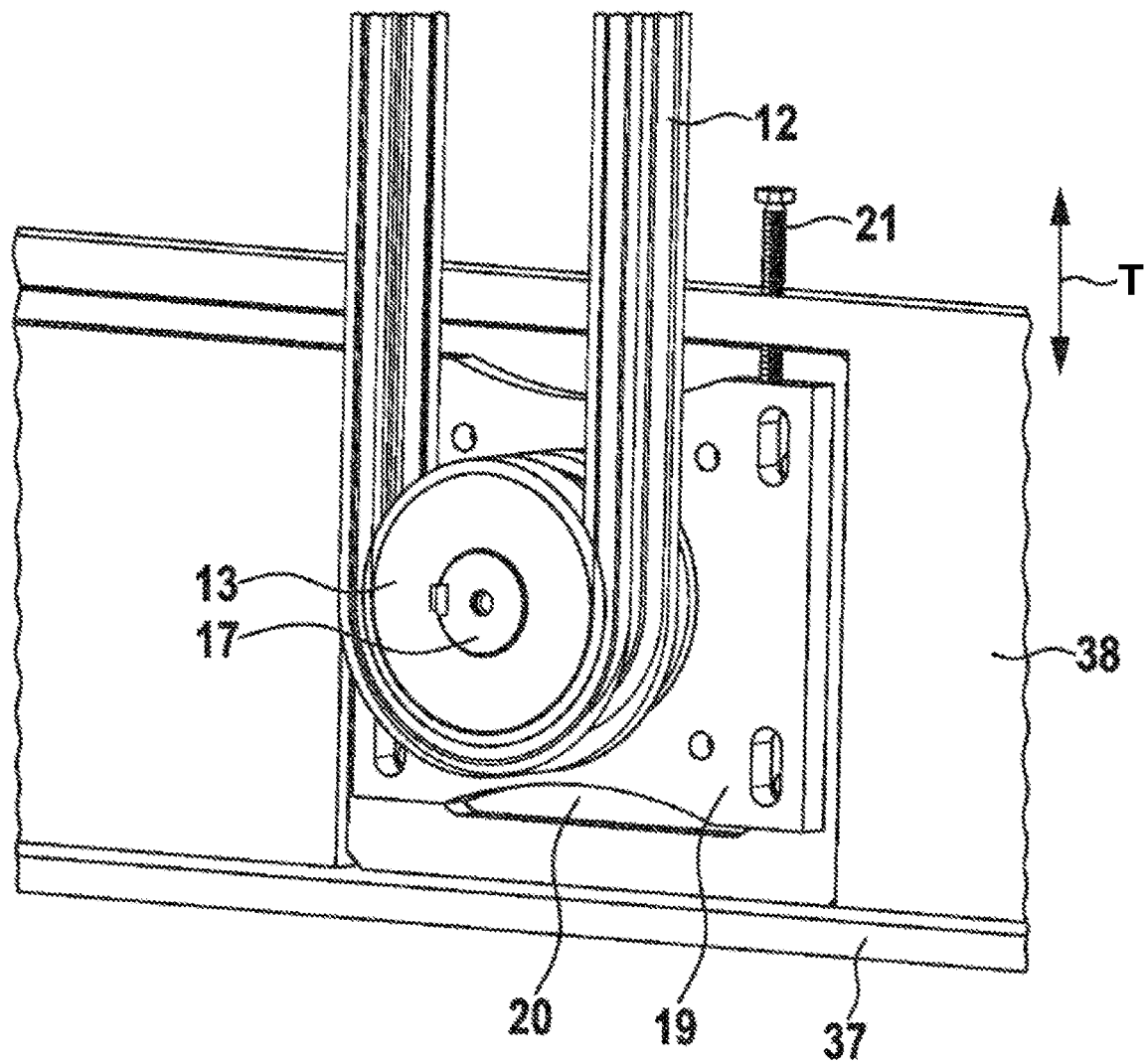
FIG. 13 shows a machine element which is rotationally driven via the drive device and which interacts with a flexible pulling device.
Figure 14:
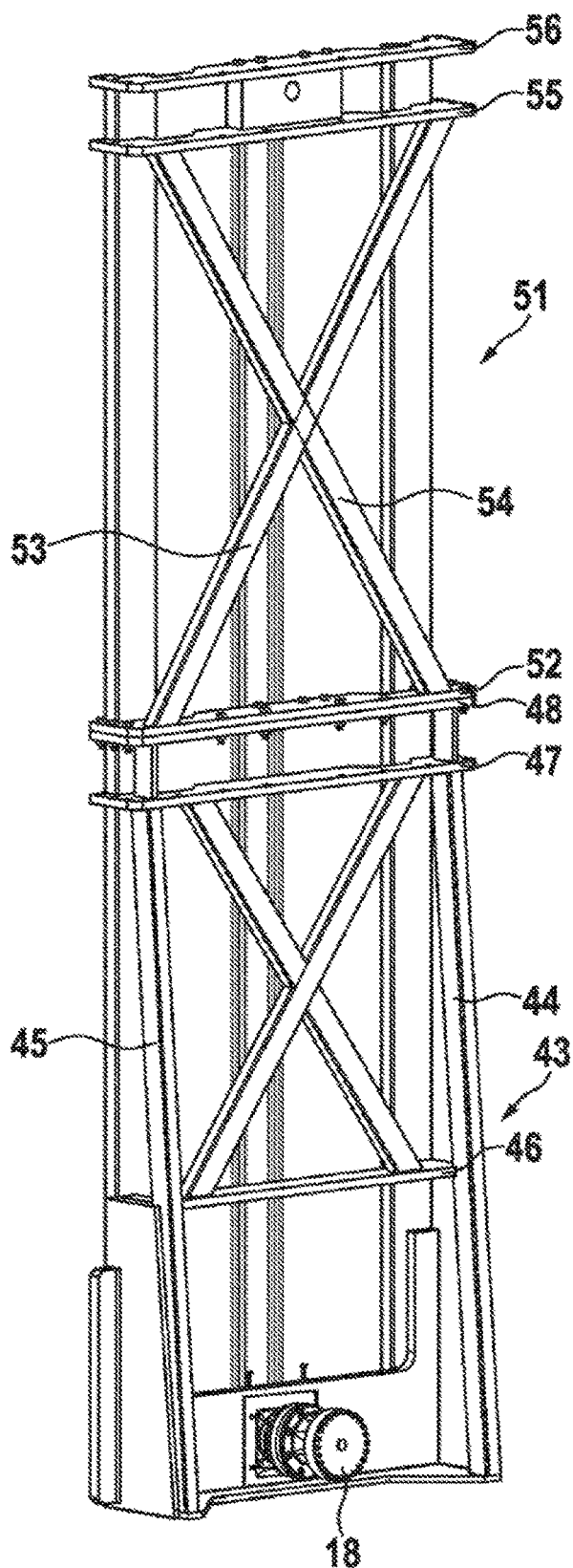
FIG. 14 is a perspective rear view of a second embodiment of a mast.
Figure 15:
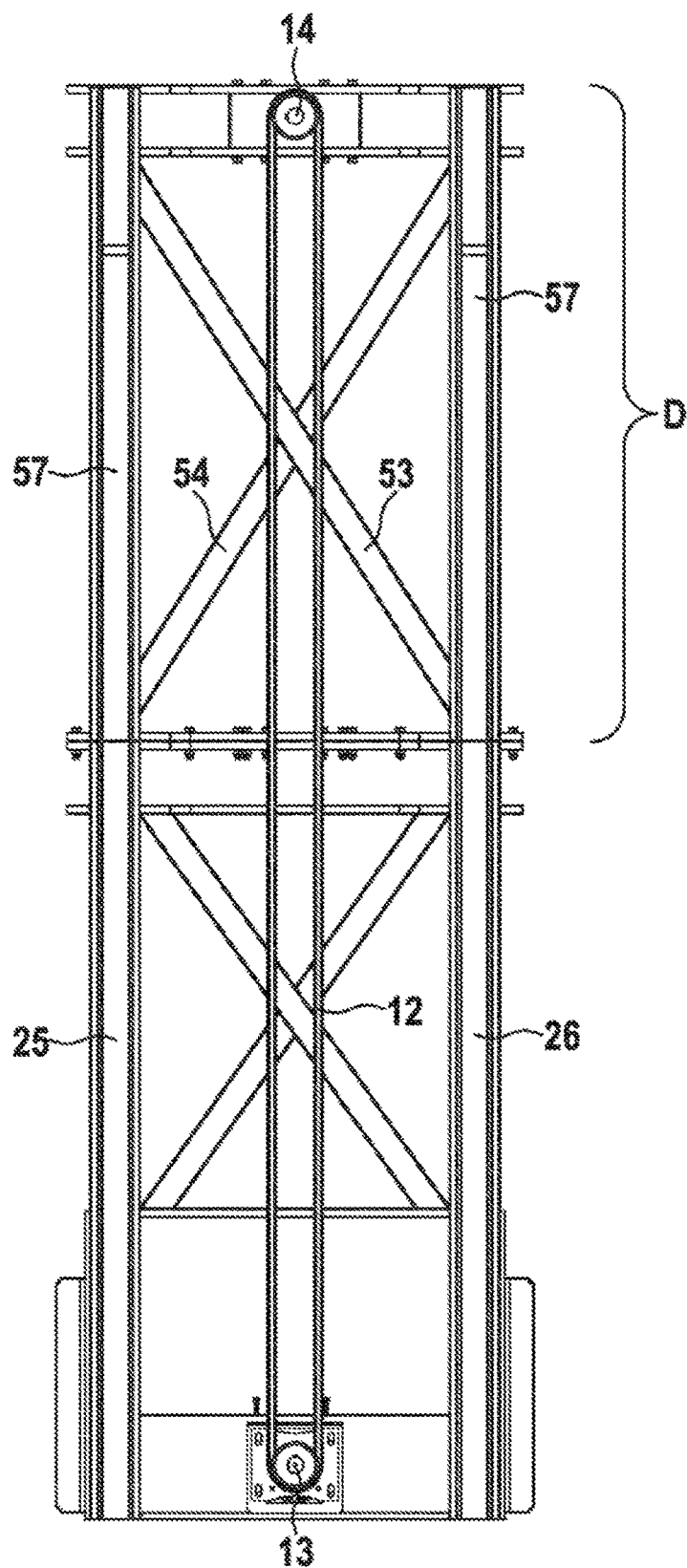
FIG. 15 is a plan view of the front of the same mast.
Figure 16:
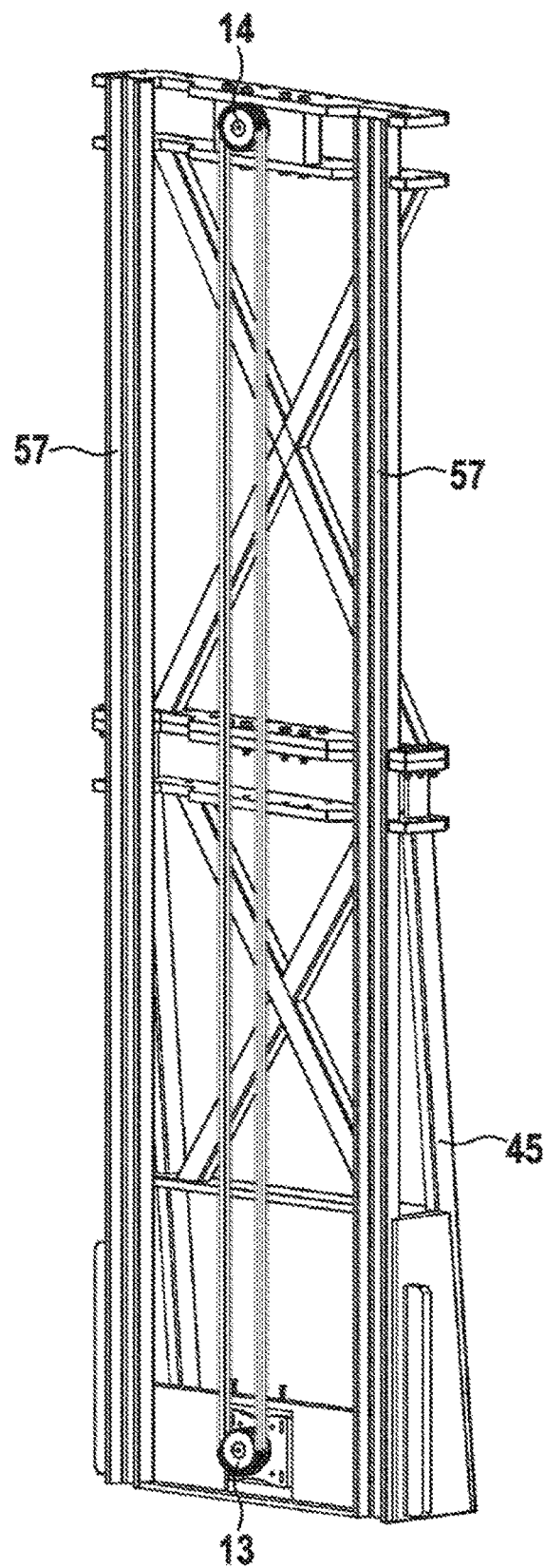
FIG. 16 is a perspective frontal view of the same mast.
Figure 17:
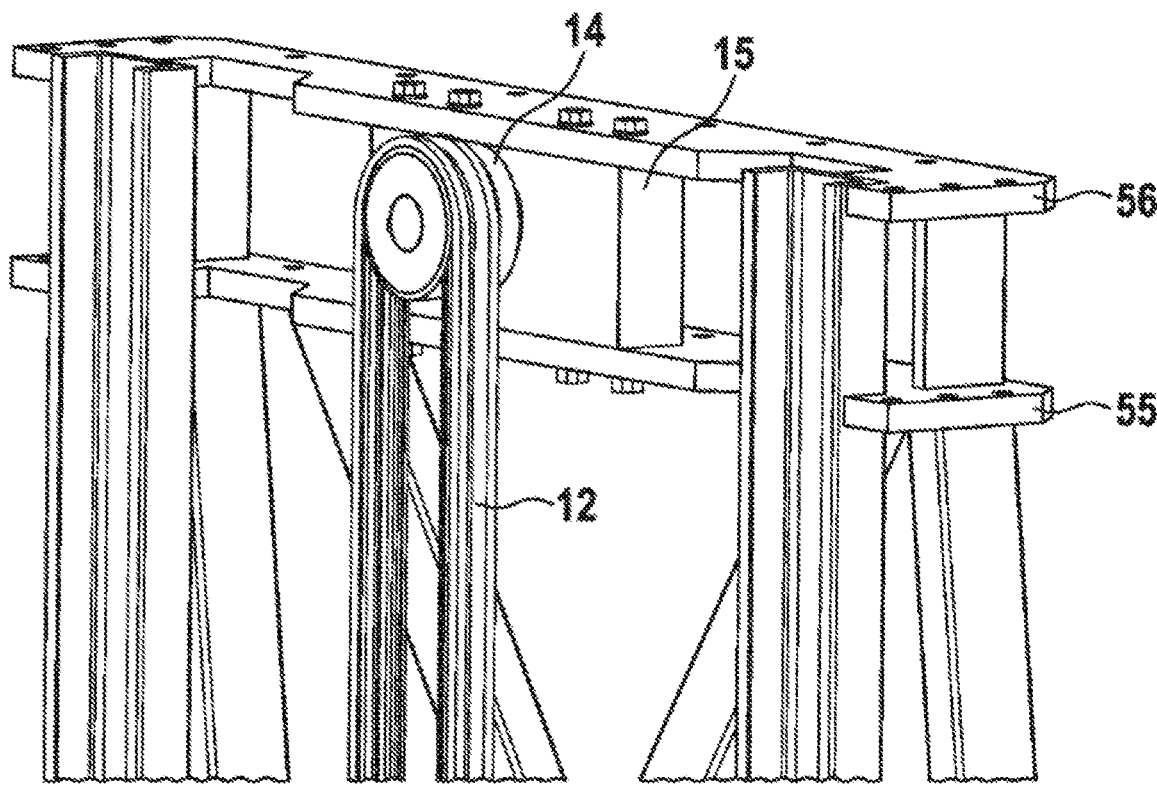
FIG. 17 is a perspective detail view of the upper region of a mast.
Figure 18:
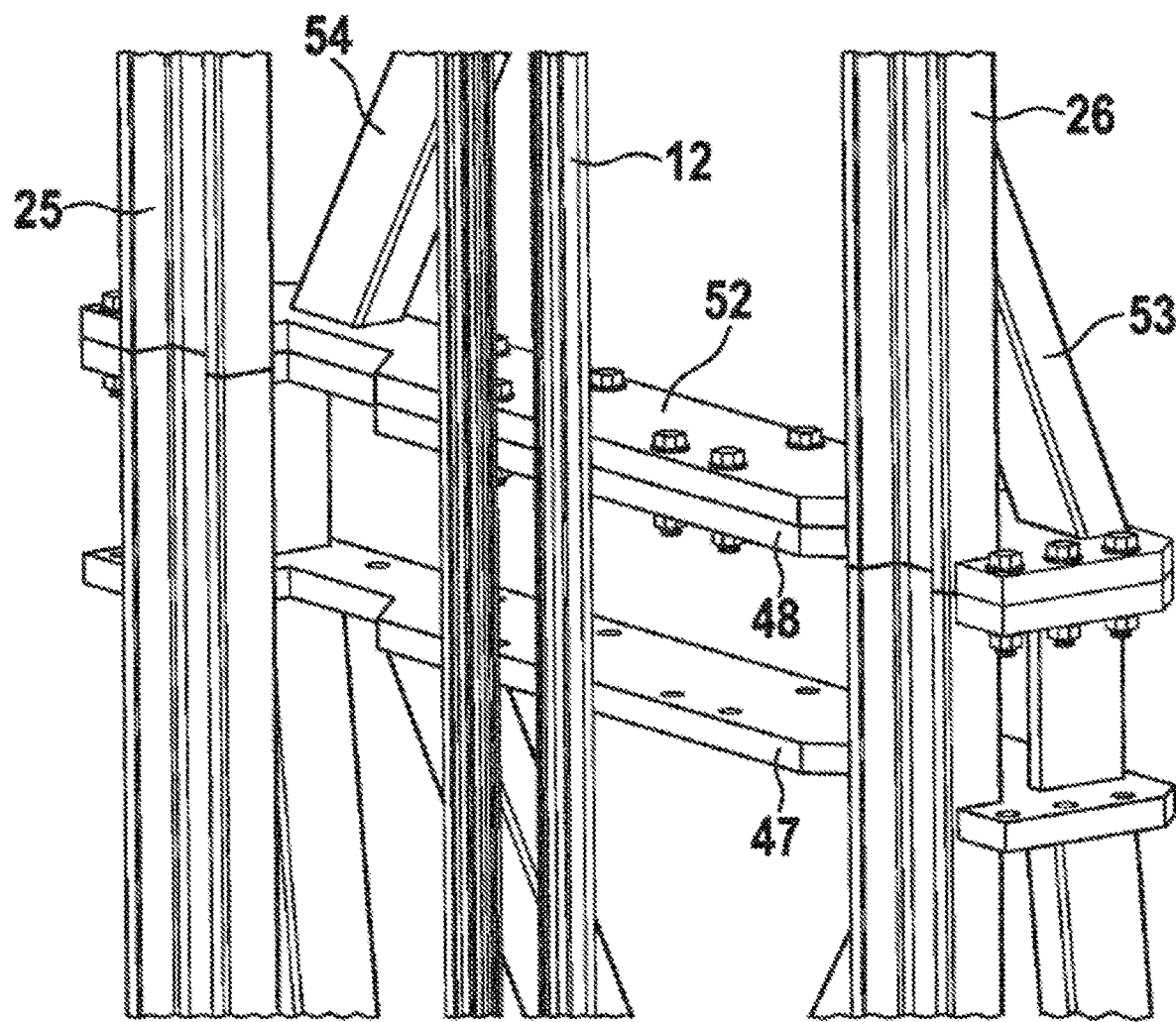
FIG. 18 is a detail view of the central region of the embodiment of the mast shown in FIGS. 14 to 16.

The drive device 18 is mounted on a bearing block 19 which is arranged on the mast 9, 10 so as to be movable for the purpose of adjusting the tension of the flexible pulling device 12 (see in particular FIGS. 12 and 13). For this purpose, the masts 9, 10 each have a bearing block receptacle 20 which has a greater extension in the tensioning direction T than the bearing block 19. According to FIGS. 12 and 13, two threaded bores, into each of which a clamping screw 21 is screwed, open into the bearing block receptacle 20 from above. The front end of each of the clamping screws 21 in the screwing-in direction is supported on a surface of the bearing block 19. As is evident from FIGS. 12 and 13, the tension of the flexible pulling device 12 can be changed by screwing in and unscrewing the clamping screws 21.

Due to the revolution around the lower and upper pulleys 13, 14, the flexible pulling device 12 has two strands 22, 23 which extend parallel with each other. In order for the flexible pulling device 12 of the two masts 9, 10 to rotate at exactly the same speed, the drive shafts 17 of the two drive devices 18 of the masts 9, 10 can, for example, be mechanically connected to each other via a connecting shaft 24 (see FIG. 5). By providing a connecting shaft 24, it is in principle also possible to provide only a single drive device 18 for the flexible pulling device 12 of the two masts 9, 10.

For the purpose of lifting and lowering, the loading platform 11 is connected to one of the two strands 22, 23 of the two flexible pulling devices 12 of the masts 9, 10, for example, to strand 23 in each case, which strands run in the same direction when the drive devices 18 are actuated.

Figure 10:
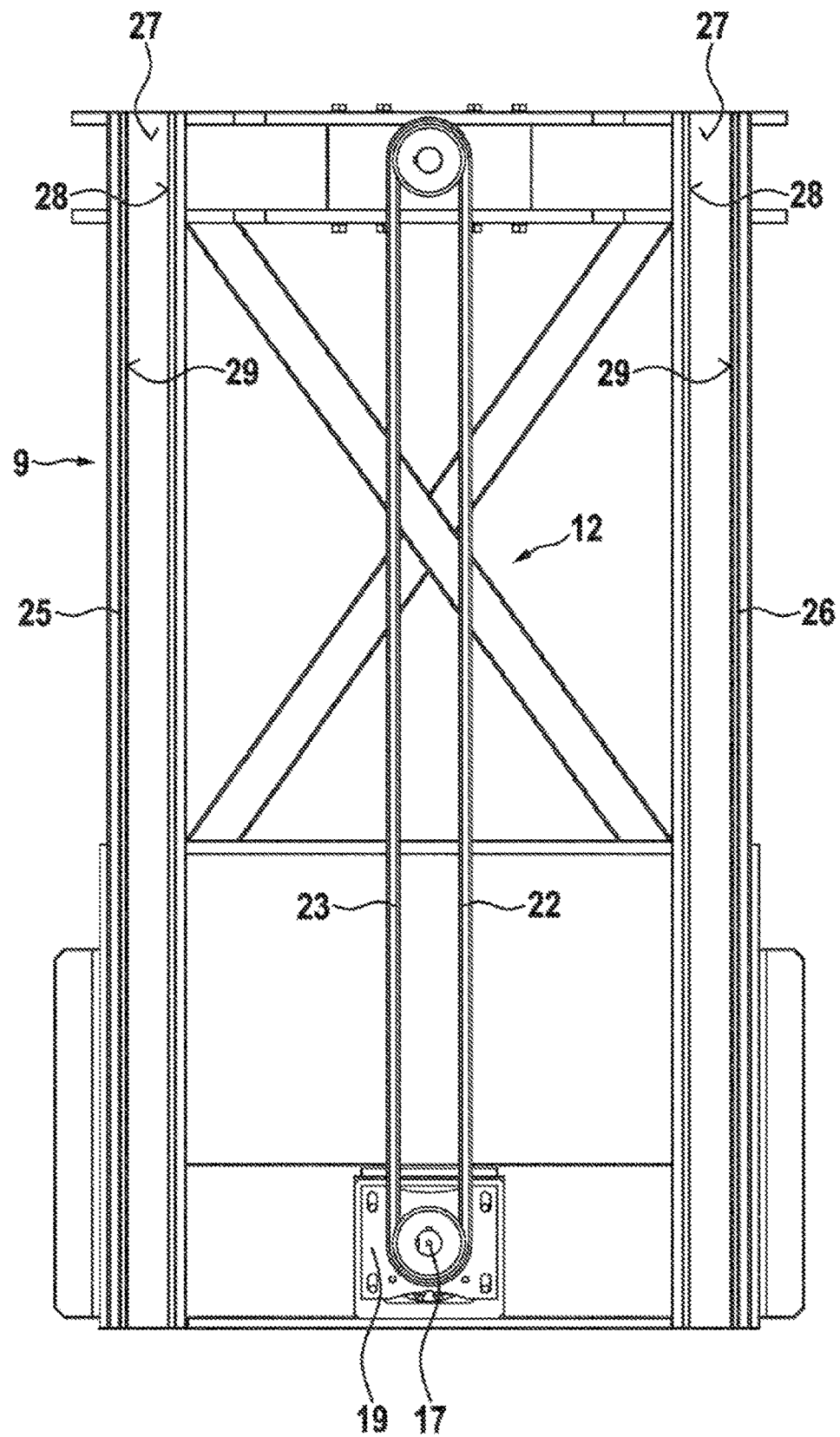
FIG. 10 is a frontal view of the front of the same mast.
Figure 11:
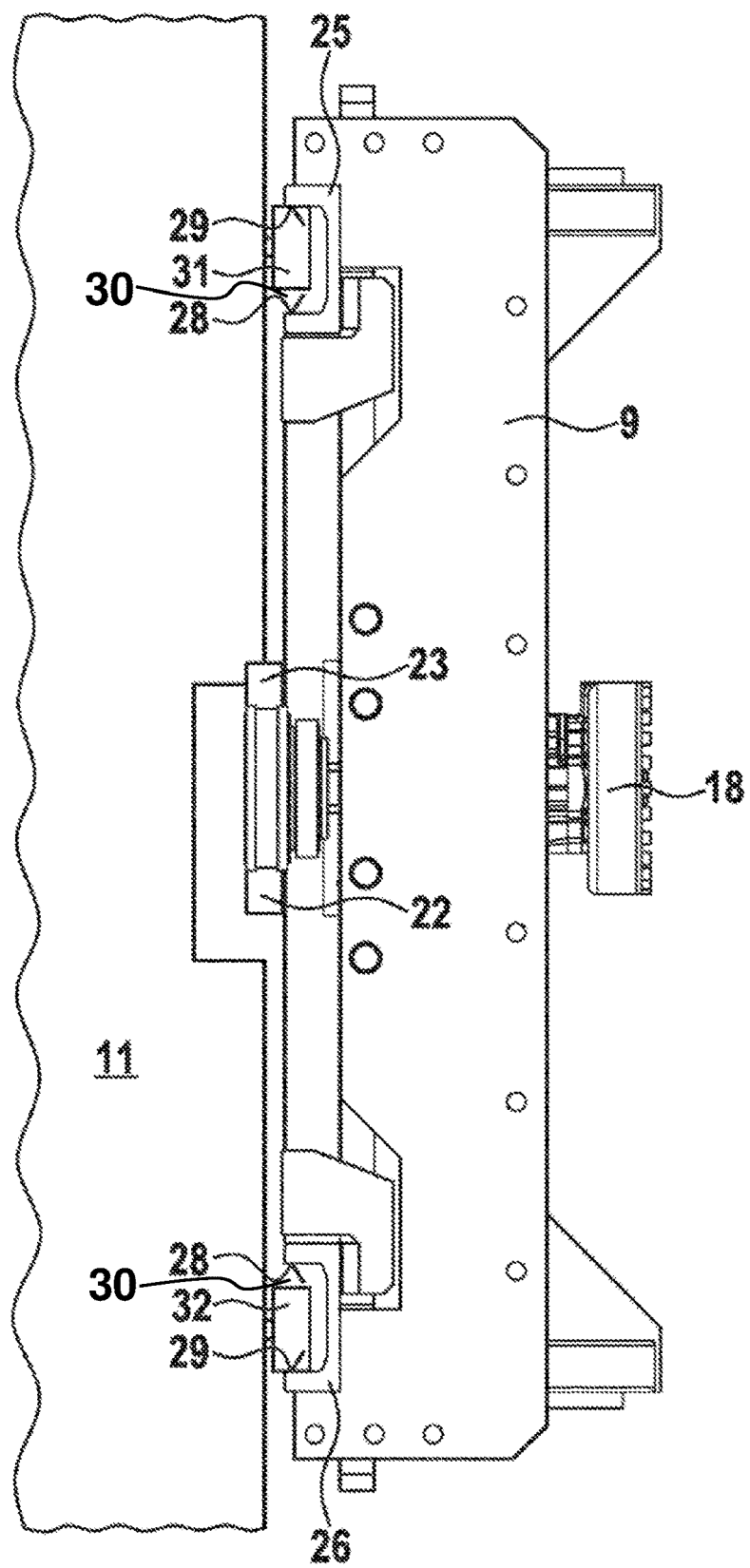
FIG. 11 is a view of the same mast from above.

Guide profiles 25, 26 are provided on the masts 9, 10 in order to guide the loading platform 11 on the masts 9, 10, as can in particular be seen in FIGS. 10 and 11, using the example of mast 9. Each guide profile 25, 26 has an internal cross-section which is approximately C-shaped. The cross-section has a base surface 27 and two mutually parallel side surfaces 28, 29 which extend perpendicular from the base surface to an open profile side 30.

The guide profiles 25, 26 are arranged on the relevant mast 9, 10 so that their open profile sides 30 face each other.

As can be seen in FIG. 11, the loading platform 11 has two guide rollers 31, 32 on the side thereof facing the mast 9, which guide rollers 31, 32 in the shown embodiment each roll on one of the two outer side surfaces 29 of the guide profiles 25, 26 and thus guide the guide platform 11 to prevent movements relative to the mast 9 in the F-R direction of the industrial truck 100. The loading platform 11 can of course also be formed correspondingly on the side (not shown in FIG. 11) facing the other mast 10. The mast 10 also has guide profiles 25, 26. It should finally be noted that the guide rollers 31, 32 can also be arranged so that they both roll on the central side surfaces 28 of the guide profiles 25, 26. Further guide rollers (not shown in the drawings) which are offset in the longitudinal direction of the guide profiles 25, 26 with respect to the guide rollers 31, 32 can also be provided, which further guide rollers in turn roll on one of the side surfaces 28 or 29. The loading platform can as a result also be secured against tilting in an axis which extends perpendicular to the plane of the drawing in FIG. 10 via the guide profiles 25, 26.

A significant advantage of the design and arrangement of the guide profiles 25, 26 and the guide rollers 31, 32 rolling in the profiles is that forces acting on the loading platform 11 in the F-R direction, as can in particular occur during loading and unloading, are directly absorbed by the two masts 9, 10 and no further, possibly technically complex, measures are required therefor.

Figure 7:
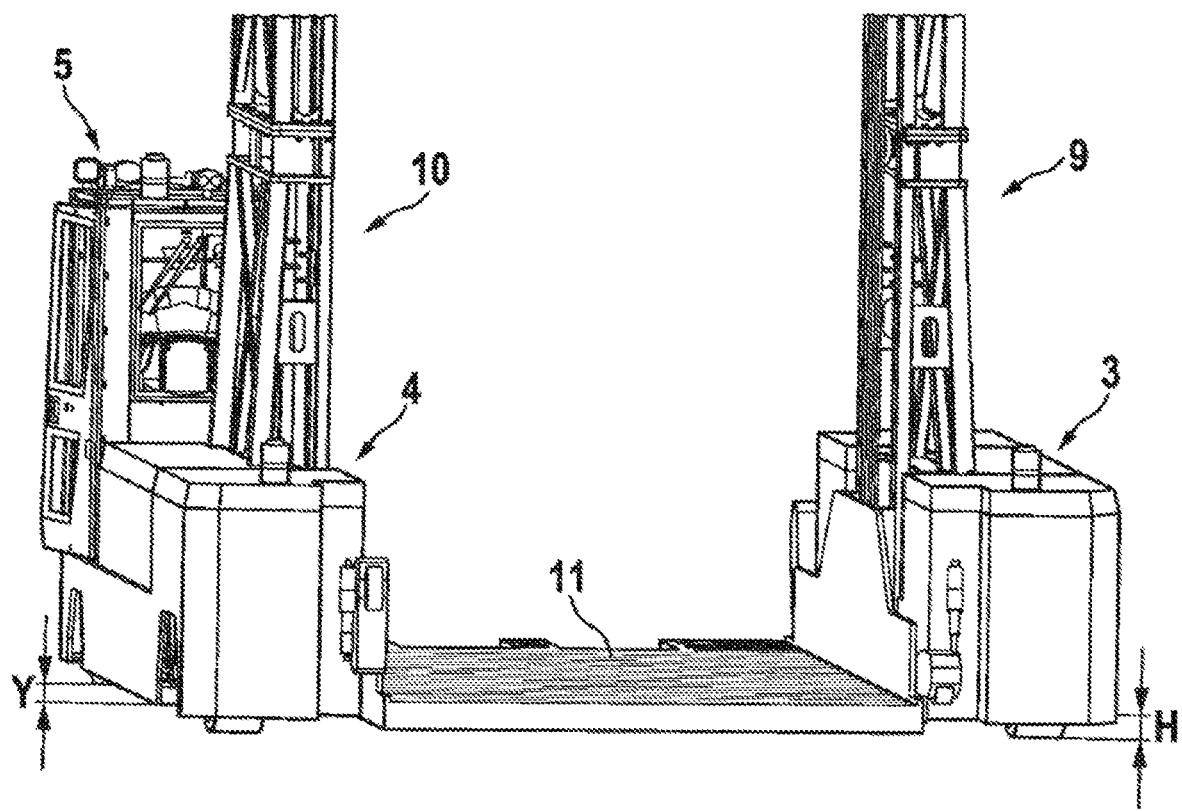
FIG. 7 is a partial view of the same embodiment in a view according to FIG. 1 from the rear.

As already mentioned above, the industrial truck 100 has a particularly low loading and unloading height H. As can be seen in FIG. 7, this is substantially identical on the front axle side and rear axle side. This is caused by the design of the chassis 1 with the cross members 8 in contrast to the known U-shaped design of the chassis 1 with a single rear cross member which, in order to achieve the required chassis rigidity, must have a considerably more voluminous cross-section than the two cross members 8 which are spaced apart from each other in the longitudinal extension of the industrial truck 100. In order to minimize the loading and unloading height H, the loading platform 11 has recesses 33 for each of the cross members 8 on the lower face thereof, so that the loading and unloading height H only slightly exceeds the vertical extension of the cross members 8 from the ground.

Each of the cross members 8 can comprise two struts 34, 35 which extend in parallel with each other and which have a rectangular, for example, a square cross-section. The struts 34, 35 are connected to each another via a connecting plate 36.

Figure 8:
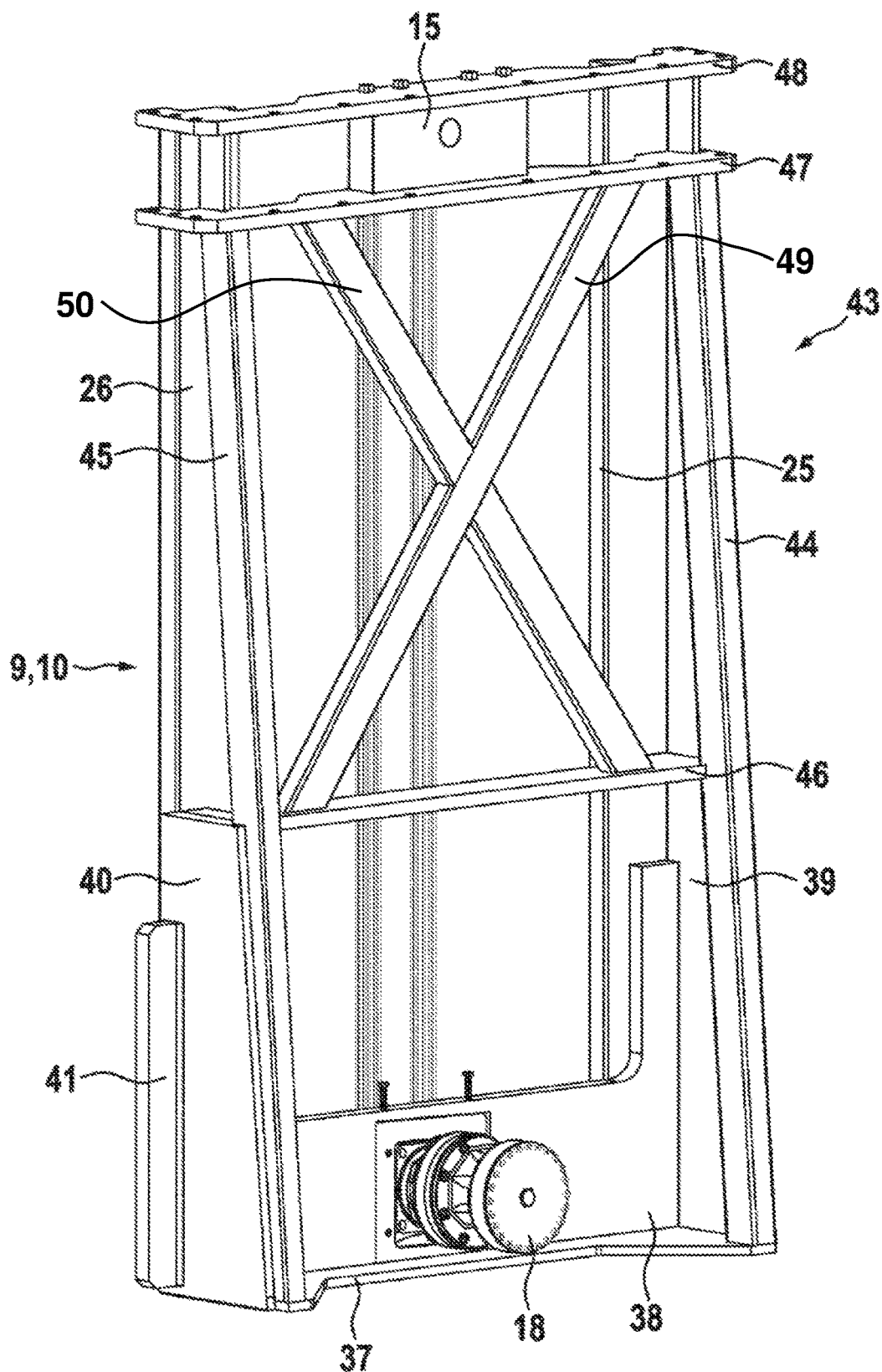
FIG. 8 is a perspective rear view of a first embodiment of one of the two masts of the industrial truck according to the present invention.
Figure 9:
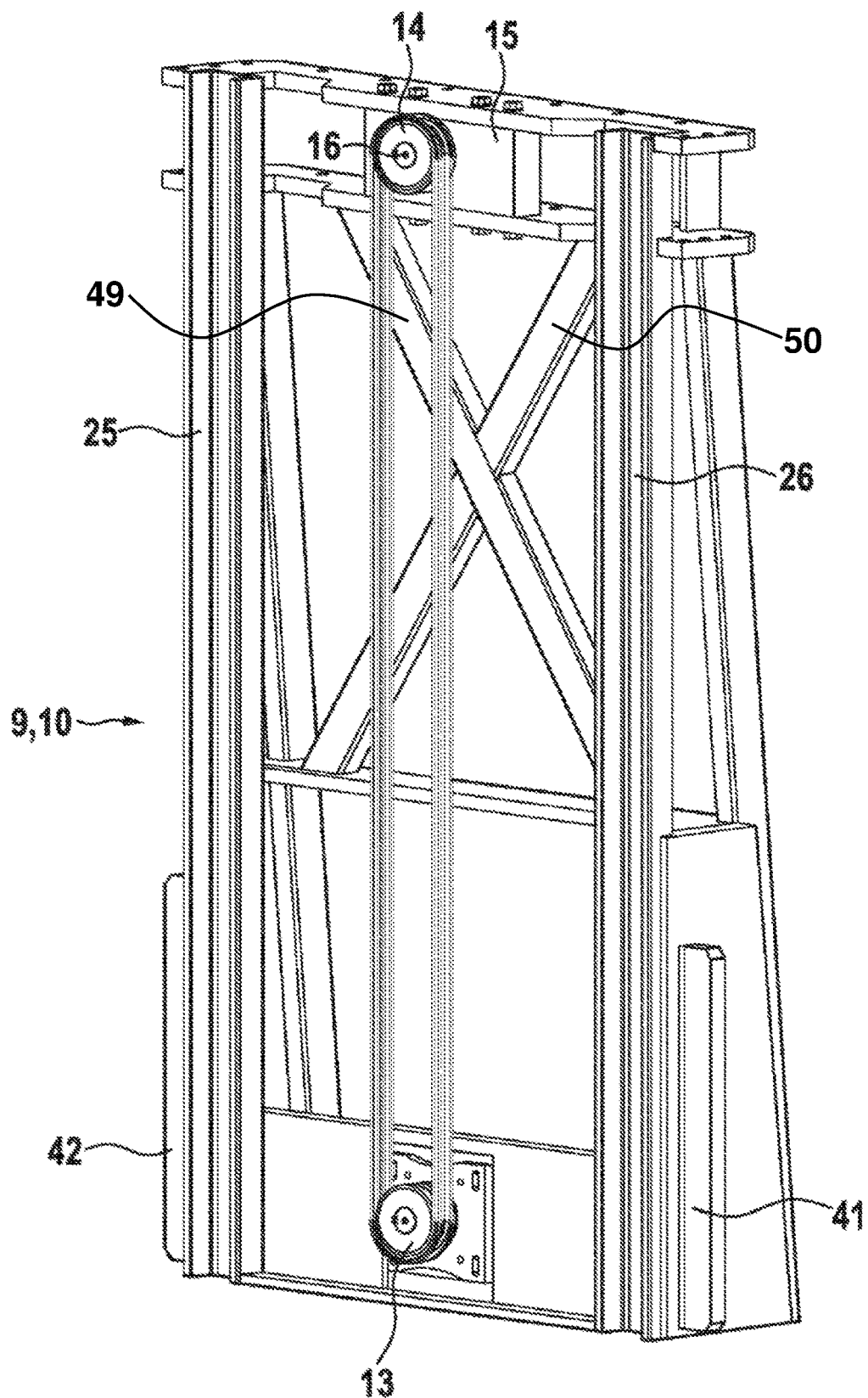
FIG. 9 is a perspective front view of the mast shown in FIG. 8.

As can be seen, for example, in FIGS. 8 and 9, the masts 9, 10 each have a base plate 37 from which a lower frame component 38, which comprises the bearing block receptacle 20, extends upward. The lower frame component 38 is approximately U-shaped when viewed from the front or the rear of the mast 9, 10. Side walls 39, 40 of the mast, which are provided with lateral stiffening ribs 41, 42, rest on the outer faces of the two legs of the lower frame component 38. A first main frame 43, which comprises lateral profiles 44, 45 which are connected to each other via cross struts 46, 47, 48, extends upward from the base plate 37. Diagonal braces 49, 50 which are arranged in an X-like manner extend between the lower cross strut 46 and the central cross strut 47. The guide profiles 25, 26 are attached to the base plate 37, the side walls 39, 40 and the cross struts 46, 47, 48. The so constructed mast is characterized by considerable torsional rigidity with simultaneously low weight and a low manufacturing outlay.

In the embodiment of the mast shown in FIGS. 8, 9 and 10, the upper bearing block 15 is arranged between the central cross strut 47 and the upper cross strut 48. As can be seen by comparison with the further embodiment of a mast 9, 10 shown in FIGS. 14 to 18, the bearing block 15 between the cross struts 47 and 48 is missing in this further embodiment. A second main frame 51 instead extends upward from the upper cross strut 48. The second main frame 51 has a lower cross strut 52 which is screwed to the upper cross strut 48 of the first main frame 43. A central cross strut 55 is connected to the lower cross strut 52 via diagonal braces 53, 54. The bearing block 15 is arranged between this central cross strut 55 and an upper cross strut 56. The guide profiles 25, 26 extend from the base plate 37 to the upper cross strut 56; in the mast shown in FIGS. 14 to 18, the guide profiles 25, 26 are formed to be longer than the guide profiles shown in FIGS. 8 to 10, for example, by adding guide profile portions 57. The flexible pulling device 12 accordingly also has a greater length in the embodiments shown in FIGS. 14 to 18 than in those shown in FIGS. 8 to 10.

From the above explanations, it can be seen that, due to the modular design of the mast with a variable number of diagonal braces and cross struts, it is possible to easily provide masts of different lengths that are adapted to user requirements. It can furthermore be seen that, due to this modular design, existing industrial trucks having corresponding masts can be adapted to changing requirements with only little effort with respect to the maximum lifting height that can be achieved therewith. For this purpose, only segments, as denoted by D in FIG. 15, together with the associated guide profile portions 57 of the relevant mast 9, 10 must be removed or added, and the flexible pulling device 12 must be replaced by one of a suitable length.

The present invention is not limited to embodiments described herein; reference should be had to the appended claims.

LIST OF REFERENCE NUMERALS

100 Industrial truck
1 Chassis
2 Loading region
3 Lateral region
4 Lateral region
5 Driver's cab
6 Front wheels
7 Rear wheels
8 Cross-bar
9 Mast
10 Mast
11 Loading platform
12 Flexible pulling device
13 Lower pulley
14 Upper pulley
15 (Upper) Bearing block
16 Axis
17 Drive shaft
18 Drive device
19 Bearing block
20 Bearing block receptacle
21 Clamping screw
22 Strand
23 Strand
24 Connecting shaft
25 Guide profile
26 Guide profile
27 Base surface
28 (Central) Side surface
29 (Outer) Side surface
30 Open profile side
31 Guide roller
32 Guide roller
33 Recesses
34 Strut
35 Strut
36 Connecting plate
37 Base plate
38 Lower frame component
39 Side wall
40 Side wall
41 Stiffening rib
42 Stiffening rib
43 First main frame
44 Lateral profile
45 Lateral profile
46 Cross strut
47 Central cross strut
48 Upper cross strut
49 Diagonal brace
50 Diagonal brace
51 Second main frame
52 Lower cross strut
53 Diagonal brace
54 Diagonal brace
55 Central cross strut
56 Upper cross strut
57 Guide profile portion
A Front axle
B Rear axle
C Container
D Segment
H Loading and unloading height
S Steering axles
R Reverse travel direction
T Tensioning direction
F Forward travel direction
X Transverse extension
Y Overall height
Z Lifting and lowering direction

What is claimed is:

1. An industrial truck comprising:
a loading platform which is configured so that a load is pushable thereon and therefrom in a direction; and
masts which are arranged opposed to each other, the masts being configured to lift, to lower, and to guide the loading platform which is arranged between the masts in a lifting and lowering direction, each of the masts comprising at least two guide profiles, each of which comprise,
an inner cross-section which is C-shaped,
a base surface,
a central side surface, and
an outer side surface
wherein,
each of the base surface, the central side surface, and the outer side surface extend in the lifting and lowering direction,
the central side surface and the outer side surface each extend perpendicularly from the base surface to an open profile side,
the central side surface and the outer side surface are parallel with respect to each other and perpendicular with respect to the direction,
wherein,
the loading platform comprises at least one guide element for each of the at least two guide profiles, the at least one guide element being configured to at least one of slide and roll on the central side surface or on the outer side surface of the respective guide profile.

2. The industrial truck as recited in claim 1, wherein the at least one guide element is a guide roller which is configured to roll.

3. The industrial truck as recited in claim 1, wherein
a respective one of the at least two guide profiles is arranged on a respective one of the masts so that the respective open profile side of the respective one of the at least two guide profiles which is arranged on the respective one of the masts faces the other respective one of the at least two guide profiles which is arranged on the other respective one of the masts.

4. The industrial truck as recited in claim 1, wherein exactly two of the masts are provided.

5. The industrial truck as recited in claim 1, wherein exactly one of the at least one guide element is provided for each of the at least two guide profiles.

6. The industrial truck as recited in claim 5, wherein exactly one guide roller is provided as the exactly one of the at least one guide element for each of the at least two guide profiles.

7. The industrial truck as recited in claim 1, wherein a plurality of the at least one guide element are provided for each of the at least two guide profiles, the plurality of the at least one guide element being arranged spaced apart from each other in the lifting and lowering direction.

8. The industrial truck as recited in claim 7, wherein exactly two guide elements are provided as the plurality of the at least one guide element.

9. The industrial truck as recited in claim 8, wherein exactly two guide rollers are provided as the exactly two guide elements.

10. The industrial truck as recited in claim 1, wherein each of the masts further comprises,
- two pulleys which are arranged spaced apart from each other in the lifting and lowering direction,
- a flexible pulling device which is configured to revolve around the two pulleys, and
- a drive device which is configured to rotationally drive at least one of the two pulleys.

11. The industrial truck as recited in claim 10, wherein the flexible pulling device comprises two strands which are arranged to extend in the lifting and lowering direction.

12. The industrial truck as recited in claim 11, wherein, the two strands are parallel with respect to each other, and the loading platform is connected to the two strands.

13. The industrial truck as recited in claim 10, wherein the drive device comprises at least one electric motor.

14. The industrial truck as recited in claim 13, wherein the industrial truck further comprises steering motors and travel drives, each of which are electrically operated.

15. The industrial truck as recited in claim 1, wherein,
- two guide elements are provided for each of the at least two guide profiles, and
- the two guide elements are arranged to be offset in the lifting and lowering direction of each of the at least two guide profiles.

* * * * *